US000001032H

United States Statutory Invention Registration [19]

[11] Reg. Number: H1032

Arnold et al.

[43] Published: Mar. 3, 1992

[54] PROCESS FOR MANUFACTURING STARCH-BASED COMPOSITIONS

[75] Inventors: John C. Arnold, Shelbyville; Robert A. Mooth, Decatur; Norman A. Portnoy, Decatur; Keith D. Stanley, Decatur, all of Ill.

[73] Assignee: A. E. Staley Manufacturing Company, Decatur, Ill.

[21] Appl. No.: 544,714

[22] Filed: Jun. 27, 1990

Related U.S. Application Data

[63] Continuation-in-part of Ser. No. 340,943, Apr. 20, 1989, abandoned.

[51] Int. Cl.[5] ..... C08G 61/00; C08G 63/00

[52] U.S. Cl. ..... 527/313; 527/312; 527/314; 527/315

[58] Field of Search ..... 527/300, 312, 313, 314, 527/315; 523/130, 131

*Primary Examiner*—Robert L. Stoll
*Assistant Examiner*—Shean C. Wu

[57] ABSTRACT

Processes for manufacturing starch copolymer compositions are provided. In one process, a modified starch is reacted with a hydrophilic vinyl monomer to produce a starch copolymer gel which is, in turn, divided in a plurality of gel fragments. The gel fragments are then dried with a stream of gel to produce a flowable, particulate starch copolymer composition. In another process, water is evaporated from the copolymer gel and further polymerization of vinyl monomers is inhibited during the evaporating by any of a variety of means such as reducing the level of residual vinyl monomer or avoiding conditions which initiate polymerization.

16 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR MANUFACTURING STARCH-BASED COMPOSITIONS

CROSS REFERENCE TO RELATED APPLICATIONS

This application is a continuation-in-part of U.S. Ser. No. 07/340,943, filed Apr. 20, 1989, now abandoned the disclosure of which is incorporated by reference.

FIELD OF THE INVENTION

This invention relates to processes of manufacturing starch-based compositions which are particularly useful as industrial thickeners.

BACKGROUND OF THE INVENTION

Being an abundant, renewable, and inexpensive polymer, starch has been chemically modified in countless ways for food and industrial purposes. For example, Shih et al., U.S. Pat. No. 4,690,996, issued Sept. 1, 1987, disclose the preparation of a starch copolymer by first reacting starch with allyl glycidyl ether and then with a combination of acrylamide and acrylic acid. The end product of this reaction is a water-in-oil emulsion said to be suitable for use as a thickener. Shih et al. disclose that the polymer can be separated from the reaction mixture by adding a flocculating agent and then filtering of the mixture followed by washing and drying of the flocculated polymer.

SUMMARY OF THE INVENTION

This invention relates to a process of manufacturing a starch-based composition comprising:

reacting, in an aqueous medium at low dry solids and under vinyl polymerization conditions, a modified starch, said starch having a terminal ethylenically-unsaturated substituent and being substantially fully hydrated, and a hydrophilic vinyl monomer to produce a starch copolymer gel; and dividing said gel into a plurality of gel fragments and then drying said gel fragments with a stream of a gas to produce a flowable, particulate starch copolymer composition capable of rehydration to a viscous solution or dispersion.

This invention also relates to a process of manufacturing a starch-based composition comprising:

reacting, in an aqueous medium at low dry solids and under vinyl polymerization conditions, a modified starch, said starch having a terminal ethylenically-unsaturated substituent and being substantially fully hydrated, and a hydrophilic vinyl monomer to produce a starch copolymer gel having low dry solids;

evaporating water from said starch copolymer gel to produce a flowable, particulate starch copolymer composition; and inhibiting further polymerization of vinyl monomers in said starch copolymer gel during said evaporating to a degree sufficient to enable said flowable, particulate starch copolymer composition to rehydrate after said evaporations to a viscous solution or dispersion.

DETAILED DESCRIPTION OF THE INVENTION

Starch Copolymer Polymerization

The starch portion of the starch copolymer viscosifier may be derived from a variety of starch sources, including cereal, leguminous, and tuber starches. Illustrative starch sources include corn, tapioca, sweet potato, sorghum, and rice. Starch is composed of both amylose (1,4-linked anhydroglucose chains) and amylopectin (1,4-linked anhydroglucose chains with periodic 1,6-linked branches of 1,4-linked anhydroglucose chains) fractions. Starches having a high amylopectin content, such as waxy corn starch, are preferred because they have a larger molecular structure which creates a greater effect on viscosity and also because they have less tendency to retrograde.

The starch is first modified by attaching a terminal ethylenically-unsaturated substituent to produce a compound of the formula Starch—O—R—CH=$CH_2$ where R is an organic group having 1 to 12 carbon atoms. Such modified starches may be prepared by a variety of starch modification processes. Illustrative modification processes are described in U.S. Pat. No. 4,079,025 (Young et al.), issued Mar. 14, 1978, which is incorporated by reference. A preferred starch modification process is the reaction of starch with an ethylenically-unsaturated epoxide such as those epoxides described in Protzman, U.S. Pat. No. 4,644,038, issued Feb. 17, 1987, which is also incorporated by reference.

It is beneficial for the modified starch molecule having a terminal ethylenically-unsaturated substituent to be lightly cross-linked. The term "lightly cross-linked" is used here to mean an amount of cross-linking which provides a waxy corn starch with a viscosity range of about 400 to 700 Brabender Units (B.U.) after heating at 95° C. for 30 minutes at 5.0 weight percent dry substance in 7.0–7.5 pH deionized water. A noncross-linked waxy corn starch typically has a viscosity under such conditions of about 100 to 150 B.U. The use of Brabender Units to quantify the degree of starch cross-linking is widely accepted in the starch industry. The Brabender viscosity response to a given set of modification conditions depends on the genetic variety of starch being modified. For example, an unmodified yellow dent corn starch typically exhibits a viscosity of about 150 to 200 B.U. at 6.0 weight percent dry substance and, when lightly cross-linked, exhibits a viscosity under these conditions of about 250 to 400 B.U. Other things being equal, light cross-linking improves the ability of the resulting starch copolymer to increase the viscosity of an aqueous dispersion of the copolymer. Cross-linking of starch is well known and the use of cross-linking compounds such as epichlorohydrin, phosphorus oxychloride, sodium trimetaphosphate, and diepoxides is common.

To complete the preparation of the starch copolymer viscosifier, the modified starch with a terminal ethylenically-unsaturated substituent is reacted with a hydrophilic vinyl monomer under vinyl polymerization conditions. A hydrophilic vinyl monomer is one which, which polymerized, produces a polymer which hydrates in the presence of water. The hydrophilic vinyl monomer has the formula R'CR''=$CH_2$ where R' is a hydrogen or methyl group and R'' is an organic group having 1 to 12 carbon atoms. Preferred hydrophilic vinyl monomers contain anionic, cationic, or other functional groups to facilitate cross-linking with common fracturing fluid cross-linking agents. Anionic groups such as carboxylates and sulfonates cross-link with the common metal ion cross-linkers such as aluminum (III), titanium (IV), zirconium (IV), and antimony (V). Preferred hydrophilic vinyl monomers containing an anionic group include acrylic acid, methacrylic acid, maleic acid, fumaric acid, and maleic anhydride. Other functional groups such as amides and amines readily cross-link with the common organic cross-linkers such as glyoxal. Preferred hydrophilic vinyl monomers containing such groups include acrylamide, methacrylate, and vinyl pyrrolidone. By employing a hydrophilic vinyl monomer containing an anionic group, such as acrylic acid, and a hydrophilic vinyl monomer containing another functional group, such as acrylamide, a random starch copolymer is formed with is capable of cross-linking with either the common metal ion cross-linkers or the common organic cross-linkers. An overview of vinyl polymerization conditions is found at Boenig, H.V., *Unsaturated Polyesters* (Elsevier Publ. Co. 1964).

The reaction of the modified starch and hydrophilic vinyl monomer are reacted in an aqueous medium at low dry solids, typically less than about 25% by weight dry solids (i.e., greater than about 75% by weight water), e.g., 5–15% dry solids. The medium may contain other liquids, but preferably consists essentially of water. The low dry solids allows for substantially full hydration of the modified starch during the reaction and a reaction medium viscosity sufficiently low to provide for efficient mixing of the reactants.

The polymerization reaction is induced by the use of an initator. Free radical yielding initiators useful in polymerizing vinyl monomers, such as benzoyl peroxide, lauroyl peroxide, potassium persulfate; redox couples such as tertiary butyl hydroperoxide and sodium metabisulfite; and the like, are generally used in the polymerization, typically in amounts ranging between 0.002 and 0.2% by weight of the monomer, depending upon the stability of the initiator. While free radical polymerizations are most common, polymerizations can also be carried out using high energy irradiation, e.g., gamma irradiation from $^{60}CO$, or high energy electrons from a Van de Graaff accelerator, etc., or ultraviolet irradiation. In certain embodiments of this invention, the polymerization reaction is conducted so as to reduce the level of residual monomer and thus inhibit further polymerization on drying of the product. This aspect of the invention will be discussed more fully later.

Elevated reaction temperatures, typically between 40° and 70° C., are used with free radical yielding initiators. Within such a temperature range, conversion is substantially complete in from one-half hour to several days, depending upon monomer and reaction variables. High energy or ultraviolet irradiation polymerization is carried out at room temperature or above or below room temperature, as desired. The reaction is generally also carried out at atmospheric or substantially atmospheric pressure. However, superatmospheric pressure is advantageously used when volatile ingredients are involved.

Dividing and Drying

The product of the reacting step is a gel of sufficient viscosity to allow it to be divided into fragments. The gel can be divided by any procedure effective to produce discrete fragments. If the gel is sufficiently stiff, it may be feasible to divide it by feeding sheets of the gel into commercially available choppers having short knives mounted tangentially on a revolving drum. The sheet may be fed through a vertical throat and the cut fragments pass through a screen and out. The screen openings can be regulated and the chopper can be operated at speeds including 1,000 rpm. If the gel is not sufficiently stiff to form sheet susceptible to cutting, the gel can be extruded through a die to form one or more ropes or ribbons. The die can be associated with a reciprocating knife to cut each rope or ribbon into fragments, or the rope or ribbon can be laid upon a surface and then cut.

The divided copolymer gel, i.e., the ropes, ribbons or fragments thereof, may be rendered less tacky. Examples of two means of reducing tack follow. First, the fragments may be dusted or otherwise coated on their exterior surface with a salt. For example, crystalline potassium chloride or less than about 7 mesh in size can be dusted onto the surface of the polymer fragments without any detrimental effect on the required properties of the gel. Since the potassium chloride is also water-soluble, no objectionable consequences result. The salt coating may also be applied during or after drying in order to increase the shelf life thereof.

Second, the fragments of copolymer gel may be, at least partially, frozen, thereby preventing the agglomeration of the fragments due to the tacky nature of the surface thereof. Freezing may be accomplished before or after fragmentation of the gel with liquid nitrogen, carbon dioxide, etc. When the gel fragments are charged to the cutter as frozen masses, it is obviously necessary that the temperature within the cutter be maintained at about 0° C. or below. Of course, freezing and dusting with a salt can be employed simultaneously or sequentially.

The cutting of the fragments into particles may be conducted at such a temperature within the above range that an independent drying step is unnecessary. Whether such a one-stage process can be accomplished depends, however, on the particular copolymer gel being treated.

The fragmented gels may be cut into fine particles of about 7 to about 100 mesh, preferably from about 20 to about 100 mesh, by mechanical cutting. The cutting may be achieved via the use of a second commercially available fragmentizer, although any such means may be used. An exemplary cutter has double-edged knives mounted perpendicularly to a revolving drum and operates at speeds including 4,500 rpm similar to the chopper described above.

The cutting procedure is conducted at a temperature of not over about 75° C., typically not over about 50° C., temperatures tending to cause sticking of the polymer to cutter surfaces.

The particles of acrylamide polymer gel are then dried by suspending them in a gas stream at a temperature ranging from about ambient to mildly elevated, e.g., about 100° C., typically from about 25° C. to about 80° C., for a time sufficient to convert the gel from a low solids content to a high solids content and a flowable particulate, e.g., from about 5 to about 60 minutes, typically from about 5 to about 30 minutes. Fluid bed or flash dryers or any other system in which small particles are suspended in a gas stream may be used for drying the gel particles.

After the drying step, the polymer is recovered in a free-flowing condition by merely collecting fallout from the gas stream or discontinuing the gas stream and evacuating the dryer.

Evaporating and Inhibiting

In certain embodiments of a process of manufacturing a starch-based composition, the copolymer gel from the reacting step is subjected to evaporation of water therefrom coupled with the inhibition of further polymerization during said evaporation. The evaporation and inhibiting steps can be conducted in concert with the dividing and drying described above, or can be conducted alone as a separate process without the steps of dividing and drying. Further, while further polymerization is inhibited during the evaporation step, the procedures which ensure that further polymerization is inhibited may be undertaken prior to the evaporation step as well as during the evaporation step.

The means of inhibiting polymerization during the evaporating step can be divided into two broad categories, the first being the minimization of the amount of residual vinyl monomer in the copolymer and the second being the avoidance of initiation of adverse polymerization. The means of the first category are employed to ensure that the level of residual monomer will be insufficient to prevent adverse polymerization during evaporation (i.e., further polymerization to an extent that adversely affects the capability of the dry copolymer to rehydrate and thicken). The means of the second category are employed to ensure that, given some residual monomer, the conditions existing within the polymer gel will prevent adverse polymerization therein.

Examples of the procedures of the first category include the addition of a reactive agent (e.g., sodium bisulfite) to the gel after the reacting step to convert residual vinyl monomer to a non-reactive form. By "reactive agent", is meant a compound which will react with residual vinyl monomer and, thus, inhibit further polymerization of vinyl monomer. Examples of suitable reactive agents include strong nucleophiles, for example, sulfur compounds such as alkali or alkaline earth metal (including ammonium) sulfites, bisulfites, metabisulfites, and the like. To the extent that the product of the reaction between the reactive agent and residual vinyl monomer is less toxic than the vinyl monomer, which is often the case, this procedure will have the added benefit of reducing the toxicity of the copolymer. Also included are steps during the reacting to increase the efficiency of the reaction with respect to polymerization of the vinyl monomer, e.g., post-addition of initiator, which reduces the level of residual vinyl monomer. Examples of the second category include the addition to the gel after the reacting step of free radical scavengers (e.g., hydroquinone mono-methyl ether) and the avoidance of temperatures within the gel which promote polymerization (e.g., drying at lower temperatures or reducing the time at elevated temperatures during drying). It should be noted that the first category does not include coagulation of the gel with a non-solvent for the copolymer (e.g., a lower alkanol or ketone) which also dehydrates the gel as this destroys the aqueous gel characteristics prior to evaporation, and, thus, there will no longer be a gel to be subjected to evaporation. Also, the drying at lower temperature should not be accomplished in air with reduced pressure (i.e., vacuum drying) because oxygen has been found to inhibit polymerization and, thus, lowering of the partial pressure of oxygen promotes polymerization.

It should also be noted that one or more means from each of the first and second categories may be employed together so that the sum of the inhibiting effects of each means results in flowable particulate copolymer gel capable of rehydration to a viscous solution or dispersion. For example, the post-addition of initiator can be used in concert with the addition of a reactive agent for residual monomer and/or a free radical scavenger, such that the resulting copolymer gel is a flowable particulate capable of rehydration to a viscous solution or dispersion.

The ability of the copolymer gel to rehydrate to a viscous solution or dispersion can be readily determined by mixing the copolymer with a solution of 2% potassium chloride in water to form a low solids (e.g., 1% by weight dry copolymer solids) solution or dispersion followed by measurement of the viscosity of the solution or dispersion (e.g., with a Brookfield RVT viscometer). The copolymer should exhibit a Brookfield RVT viscosity (1% by weight dry solids solution in 2% potassium chloride measured with a No. 3 at 20 rpm) of at least about 200 cps.

The dryer apparatus employed in the evaporating step may be of any type consistent with the means chosen to inhibit further polymerization. The design and selection of dryers is discussed by K. Davich, "Choosing a Dryer: Dryer Types and Selection Steps", *Powder and Bulk Engineering*, pp. 26–35 (April 1990), the disclosure of which is incorporated by reference. Examples of suitable dryers are drum dryers, e.g., top roller fed single drum dryers and nip fed double drum dryers.

The copolymer will be used as a thickener in industrial applications, for example, in replacing cellulosic thickeners, e.g., in coatings, paints, emulsions, paper sizes, paper coatings, cementitious grouts and mortars, walljoint compounds, and the like.

The following examples will serve to illustrate the invention and should not be construed to limit the invention because variations within the scope and spirit of the invention will be apparent to those of skill in the art in possession of this specification. All parts, percentages, ratios, and the like expressed anywhere in this specification and the appended claims are by weight, unless otherwise indicated in context.

EXAMPLES

Example 1

The following example illustrates a process of preparing a copolymer gel within the scope of this invention.

An allyl glycidyl ether starch is prepared as follows. One thousand grams of anhydrous sodium sulfate and 60 g of 98 percent sodium hydroxide were dissolved in 6000 g of tap water. With vigorous stirring, 4000 g dry substance waxy corn starch were added. The slurry was warmed to 40° C. and 4.0 g of allyl glycidyl ether were added. The allyl glycidyl ether was a commercial product of the Pfaltz & Bauer Company and contained 3100 rpm residual epichlorohydrin. The slurry was maintained at 40° C. with stirring as the reaction proceeded.

After 18 hours, the pH of the reaction slurry was lowered to 5.5 with 15 percent hydrochloric acid. The reaction product was recovered by filtration on a 32 cm bench top Buchner funnel, washing the filter cake with 20 liters of deionized water and 16 liters of 3A alcohol, and drying at 54° C. for 5 hours. The product was 91.6 weight percent dry substance. It had a viscosity of 450 Brabender Units after heating at 95° C. for 30 minutes at 5.0 percent dry substance in 7.0 pH deionized water.

An amount, 40.2 g as is (37.5 g dsb), of allyl glycidyl ether starch prepared substantially as above were combined with 1,065 g of deionized water. The starch was pasted and held at 205°–210° F. for 30 minutes while stirring the paste at 200–250 rpm. The water lost during the cooking was added back. An additional 336 g of deionized water were added to the reactor.

An amount (15.0 g) of glacial acrylic acid was then added to the reactor. The pH of the system was then adjusted to 6–6.5 pH with 31% potassium hydroxide and 0.16 g of ethylene-diamine-tetra-acetic acid, sodium salt was dissolved in 5 ml of deionized water and added to the reactor. Then, 52.5 g of 97% acrylamide were added to the reactor.

The reactor was then assembled and placed in a 50° C. water bath. The reactants were sparged with nitrogen gas for 30 minutes. A nitrogen gas blanket was maintained throughout the reaction. After sparging, 0.75 g of the initiator solution was added to the reactor. The initiator solution was 0.16 g of 2,2'-azobis-(2-amidinopropane) dihydrochloride in 9.75 g of deionized water.

Twelve hours after the initiator addition, 1.25 g of fresh initiator solution were added to the reactor and six hours after the second initiator addition, 3.3 g of sodium bisulfite dissolved in 50 g of deionized water were added to the reactor. Two hours after the bisulfite addition, hydroquinone methyl ether (HQMMe) dissolved in 10–15 g of ethanol was added to the reactor. The HQMMe amount was 0.16% on the as is weight of the reaction mass. The residual monomer in the reaction mixture at various times is shown below.

| Residual Monomer Analysis: | | |
|---|---|---|
| Reaction Step | Acrylamide, %, dsb | Acrylic Acid, %, dsb |
| Before fresh initiator | 2.5 | 4.6 |
| Before bisulfite | 0.9 | 3.5 |
| Before HQMMe | 0.1 | 1.5 |

Example A

A copolymer gel was prepared substantially as described in Example 1, except that the second addition of initiator, the addition of sodium bisulfite, and the addition of hydroquinone methyl ether were omitted.

Example B

A copolymer gel prepared substantially as described in Example A was coagulated, filtered, and dried as follows. First, the thick gel was diluted with an approximately equal volume of deionized water. The diluted gel, now pourable as a viscous syrup, was poured into several times its own volume of aqueous ethanol (95% by volume) with vigorous mixing, to coagulate the copolymer. The slurry was then filtered and the filter cake was dried at about 50° C. for about three hours and then ground through a 2 mm screen.

Example C

The product of Example B was redissolved in deionized water to 7% copolymer solids and redried as a film under reduced air pressure of 10 mm of Hg and at room temperature for 36 hours.

Example D

A gel was prepared as in Example A, except that the addition of hydroquinone methyl ether was restored and air was bubbled through the solution during mixing of the hydroquinone methyl ether.

Example 2

A laboratory double drum dryer was preset at 260° F. and 7 rpm and an as is gel prepared substantially as described in Example 1 was dropped into the nip of the dryer. The dry product was removed at the blade.

Example 2A

The drying method of Example 2 was repeated using a gel prepared as described in Example A.

Example 3

A gel prepared substantially as described in Example 1 was cast as a film about 2 mm thick in a teflon coated pan. The film was dried at 50° C. and atmospheric pressure for about 2 hours.

Example 3A

The drying method of Example 3 was repeated using a gel prepared as described in Example A.

Example 4

A gel prepared substantially as described in Example 1 was cast as a film about 0.025 inch thick (0.64 mm) on a teflon belt and dried at atmospheric pressure for 2.5 minutes under forced air at 185° C.

Example 4A

The drying method of Example 4 was repeated using the gel of Example A.

Example 5

A gel prepared substantially as described in Example 1 was cast as a film about 2 mm thick and dried at 45° C. -50° C. and an air pressure of 0.1 mm of Hg for 20 minutes.

Example 5A

The drying method of Example 5 was repeated using the gel of Example A.

Example 6

A gel prepared substantially as described in Example 1 was cast as a film and dried as described in Example 5, but for an additional 20 minutes, for a total of 40 minutes of drying.

Product Evaluation for Examples 2–6, B, C, D and 2A-5A

The dried products from above were mixed with a sufficient amount of a 2% potassium chloride solution to prepare a solution having 1% dry copolymer solids. The Brookfield viscosity of the solution, taken with a No. 3 spindle at 20 rpm, along with the appearance of the solution and the level of residual acrylamide in the dry copolymer are reported in Table 1, below.

TABLE 1

| | | Appearance | | | |
|---|---|---|---|---|---|
| Example | Brookfield Viscosity (CPS) | Smooth | Long | Separates on Standing | Residual Acrylamide (wt. %) |
| B | 600–800 | very | very | no | <0.01 |
| C | 380 | very | very | no | <0.01 |
| D | 500 | no | no | yes | 2–4 |
| 2 | 305–390 | fairly | fairly | no | <0.03 |
| 2A | 220 | no | no | yes | 2–4 |
| 3 | 520 | fairly | fairly | no | <0.3 |
| 3A | 310 | fairly | fairly | no | 2–4 |

TABLE 1-continued

| Example | Brookfield Viscosity (CPS) | Appearance | | | Residual Acrylamide (wt. %) |
|---|---|---|---|---|---|
| | | Smooth | Long | Separates on Standing | |
| 4 | 420 | fairly | fairly | no | <0.3 |
| 4A | 210 | slightly | slightly | no | 2–4 |
| 5 | 620 | fairly | fairly | no | <0.3 |
| 5A | 180 | no | no | yes | 2–4 |
| 6 | 410 | fairly | fairly | no | <0.3 |

Example 7

The example illustrates a process involving dividing and drying as discussed above. A gel prepared substantially as described in Example 1, at about 8% copolymer solids was loaded into the barrel of a 100 cc syringe. The gel was forced through the barrel of the syringe through an aperture several millimeters in diameter. The gel extrudate was cut upon exit into small, ½ cm, chunks which were allowed to fall into crystalline potassium chloride. The potassium chloride coated the chunks of extrudate and made them non-tacky. The chunks readily redispersed in water. The chunks can be dried in a fluidized bed dryer or flash dryer.

What is claimed is:

1. A process of manufacturing a starch-based composition comprising:

reacting, in an aqueous medium at low dry solids and under vinyl polymerization conditions, an allyl glycidyl ether starch, said starch being substantially fully hydrated, and a hydrophilic vinyl monomer to produce a starch copolymer gel; and dividing said gel into a plurality of gel fragments and then drying said gel fragments with a stream of a gas to produce a flowable, particulate starch copolymer composition capable of rehydration to a viscous solution or dispersion.

2. A process of claim 1 wherein said starch is lightly cross-linked.

3. A process of claim 1 wherein said hydrophilic vinyl monomer is selected from the group consisting of acrylic acid, methacrylic acid, maleic acid, fumaric acid, maleic anhydride, acrylamide, methacrylamide and N-vinyl pyrrolidone.

4. A method of claim 1 wherein said dividing is by extruding said gel through a die and cutting said extrudate.

5. A method of claim 1 wherein said gel, after said dividing, is coated with an inorganic salt prior to said drying.

6. A method of claim 5 wherein said salt is potassium chloride.

7. A method of claim 1 wherein said drying is by flash drying or fluidized bed drying.

8. A process of manufacturing a starch-based composition comprising:

reacting, in an aqueous medium at low dry solids and under vinyl polymerization conditions, an allyl glycidyl ether starch, said starch being substantially fully hydrated, and a hydrophilic vinyl monomer to produce a starch copolymer gel having low dry solids;

evaporating water from said starch copolymer gel to produce a flowable, particulate starch copolymer composition; and inhibiting further polymerization of vinyl monomers in said starch copolymer gel during said evaporating to a degree sufficient to enable said flowable, particulate starch copolymer composition to rehydrate, after said evaporating, to a viscous solution or dispersion.

9. A process of claim 8 wherein said inhibiting comprises minimizing the amount of residual vinyl monomer in said copolymer.

10. A process of claim 9 wherein said minimizing reduces said amount to less than about 0.3% by weight of the dry solids of said copolymer.

11. A process of claim 9 wherein said minimizing comprises reacting residual monomer with a reactive agent selected from the group of alkali or alkaline earth metal sulfites, bisulfites, and metasulfites.

12. A process of claim 9 wherein said minimizing comprises post-addition of initiator.

13. A process of claim 8 wherein said inhibiting comprises avoiding initiation of adverse polymerization.

14. A method of claim 13 wherein said avoiding comprises adding a free-radical scavenger to said gel after said reacting.

15. A method of claim 8 wherein said starch is lightly cross-linked.

16. A method of claim 8 wherein said hydrophilic vinyl monomer is selected from the group consisting of acrylic acid, methacrylic acid, maleic acid, fumaric acid, maleic anhydride, acrylamide, methacrylamide and N-vinyl pyrrolidone.

* * * * *